United States Patent Office 3,595,897
Patented July 27, 1971

3,595,897
ADDITION OF HYDROGEN CYANIDE TO ORGANOSILICON COMPOUNDS CONTAINING UNSATURATED SUBSTITUENTS
Earle S. Brown, South Charleston, W. Va., Frank D. Mendicino, Marietta, Ohio, and Edward. A Rick, Charleston, W. Va., assignors to Union Carbide Corporation, New York, N.Y.
No Drawing. Filed Nov. 12, 1968, Ser. No. 775,101
Int. Cl. C07f 7/02, 7/04
U.S. Cl. 260—448.2E        16 Claims

ABSTRACT OF THE DISCLOSURE

A homogeneous liquid phase process which comprises contacting hydrogen cyanide and an organosilicon compound containing at least one unsaturated substituent in the presence of a zero-valent nickel, palladium or platinum complex, under such conditions of temperature and pressure as to maintain a liquid phase reaction mixture. In a preferred embodiment, excess, non-reactive ligand is added to the reaction mixture in such an amount that the ratio of moles of excess ligand (which can be the same as or different from the ligand in the catalyst complex) to moles of HCN is varied within the range of 0.1 to 1 to 25 to 1 in order to greatly increase the turnover of the catalyst, i.e., number of moles of product per mole of catalyst.

This invention relates to a process for producing cyano-substituted silicon-containing compositions of matter.

In a broad aspect the novel process involves contacting hydrogen cyanide and an organo-silicon compound containing at least one organic substituent containing olefinic unsaturation on at least one silicon atom in the presence of a zero-valent nickel, palladium or platinum complex. The first two metals are preferred.

The exact structure of the olefinically unsaturated substituent on silicon in the starting organo-silicon compound is generally not critical. It is preferred that the substituent be attached to silicon through a non-hydrolyzable ≡Si—C≡ linkage rather than through a hydrolyzable ≡Si—O—C≡ linkage—although those compounds having the substituent attached in the latter way are also useful as starting materials in the present invention. The olefinic unsaturation may be activated, i.e., in conjugation with another multiple bond, e.g., those in $$-COOH, -COOCH_3, -CHO, -\overset{O}{\underset{\|}{C}}CH_3, -C\equiv N \text{ or } -C=C$$

or it may be nonactivated. The organosilicon compounds containing nonactivated olefinic unsaturation are preferred starting materials. It is surprising that hydrogen cyanide adds quite readily to such nonactivated olefinic unsaturation.

Preferred silicon-containing starting materials are characterized by the presence of the following radical:

(I) $\qquad Z_n-Si\equiv$ wherein at least one of the three (3) free valences of the silicon atom are bonded directly to hydrolyzable groups such as halo, alkoxy, acyloxy, aryloxy, amino, and the like, and/or oxygen which in turn is bonded to other silicon atoms to form a siloxane. The remaining free valences of the silicon atom are bonded by carbon-to-silicon bonds to monovalent organic groups. In the above formula Z is a radical containing from 2 to about 18 carbon atoms and contains olefinic unsaturation and $n$ is a least 1 and typically not greater than about 3.

Specifically illustrative of such organosilicon starting materials are those silanes and siloxanes depicted by the following component formula:

(II)

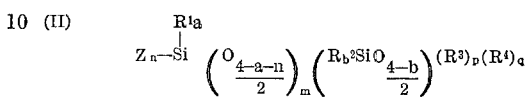

wherein Z and $n$ are as described above, $R^1$ and $R^2$ are hydrogen or any monovalent organic group bonded to silicon by a carbon-to-silicon bond and typical each contains not more than about 12 carbon atoms; $R^3$ is a hydrolyzable and/or condensable radical such as hydroxyl, alkoxy, aryloxy, acyloxy, amino, halo and the like; $R^4$ is hydrogen, alkyl, aryl, acyl and the like; $m$ is 0 or 1; $a$ is 0, 1 or 2; $b$ is 0, 1, 2 or 3; $o$ is 0 or 1, and $o$ is 0 when $m$ is 0; $p$ is equal to $4-a-n$ when $m$ is 0, and when $m$ is 1, $p$ is 0. and $q$ is 0 when $p$ is equal to $4-a-n$ and $q$ is 0 or a positive number when $m$ is 1.

Illustrative of $R^1$ or $R^2$ is any monovalent organic radical such as alkyl (e.g., methyl, ethyl, pentyl, dodecyl, octadecyl, 2-ethylhexyl, and the like), cycloalkyl (such as cyclobutyl, cyclohexyl, 4-methylcyclohexyl, and the like), aryl (such as phenyl, 2-naphthyl, 2-anthracyl, biphenylyl, and the like), alkaryl (such as 4-methylphenyl, 2,4-diethylphenyl, 4-dodecyclphenyl, and the like), aralkyl (such as phenylethyl), alkenyl (such as vinyl, allyl, 3-butenyl, oleyl, and the like), alkadienyl (such as 1-butadienyl-1,3; 1-octadecatrienyl-9,11,13; 1-neoprenyl, and the like), cycloalkenyl (such as 3-cyclohexenyl), haloalkyl (such as chloromethyl, gamma chloropropyl, 3,3,3,-trifluoropropyl, perfluoropropyl, haloaryl (such as 4-chlorophenyl, 2,4-dichlorophenyl, chloronaphthyl), halocycloalkyl (such as 4-chlorocyclohexyl), cyanoalkyl (such as beta-cyanoethyl, gamma-cyanopropyl and the like); cyanoaryl (such as 4-cyanophenyl); cyanocycloalkyl (such as 4-cyanocyclohexyl, 3-cyanocyclopentyl, and the like); carboxyalkyl (such as beta-carboxyethyl, gamma-carboxypropyl, and the like); carboxyaryl (such as 4-carboxyphenyl); carboxycycloalkyl (such as 4-carboxycyclohexyl, 3-carboxycyclopentyl, and the like; isocyanatoalkyl (such as gamma-isocyanatopropyl, delta-isocyanatobutyl, and the like); isocyanatoaryl (such as 4-isocyanatophenyl); isocyanatocyloalkyl (such as 4-isocyanato-cyclohexyl); alkyl or aryl carboxyalkyl (such as beta-carbomethoxyethyl, gamma-carbophenoxypropyl, and the like); hydroxyalkyl such as hydroxymethyl, gamma-hydroxypropyl, and the like); hydroxy (polyalkyleneoxy)-alkyl (such as omega-hydroxy(polyethyleneoxy)propyl, and the like); alkenoyl-oxylalkyl such as gamma-acrylyloxypropyl, gamma-methacrylyloxypropyl, and the like); epoxyalkyl ,such as 1,2-epoxyethyl, 1,2-epoxypropyl, 1,2-epoxybutyl, and the like); epoxyalkyloxyalkyl (such as glycidyloxypropyl); epoxycycloalkyl (such as beta-3,4-epoxycyclohexylethyl); aminoaryl and aminoalkyl (such as aminomethyl, gamma-aminopropyl, delta-aminobutyl, p-aminophenyl, and the like); and the like.

Illustrative of alkoxy, acyloxy, aryloxy, amino, halo, and the like, such as mentioned above and characterized by R³ when p is a positive number, are for example chloro, bromo, fluoro, methoxy, ethoxy, propoxy, dodecyloxy, isopropoxy, and the like; phenoxy, naphthyloxy, biphenyloxy, and the like, alkylamino and arylamino (such as methylamino, diethylamino, phenylamino, and the like), formyloxy, acetoxy, proprionoxy, and the like, any organo-functional radicals such as hydroxyalkoxy (such as beta-hydroxyethoxy, gamma-hydroxypropoxy, and the like); hydroxyalkoxyalkoxy (such as beta-hydroxyethoxyethoxy, omega - hydroxy(polyethyleneoxy)-ethoxy, omega-hydroxy(poly-1,2-propyleneoxy) ethoxy, and the like); cyanoalkoxy (such as beta-cyanoethoxy, beta-cyanohexoxy and the like); cyanoalkoxyalkoxy (such as beta-cyanoethoxyethoxy, omega-cyanoethoxy (polyethyleneoxy), omega-cyanoethoxy(poly - 1,2 - propyleneoxy), and the like); carboxyalkoxy (such as beta-carboxyethoxy, beta-carboxyhexoxy and the like); haloalkoxy (such as chloromethoxy, bromoethoxy, perfluoropropoxy, and the like); and the like.

Illustrative R⁴ radicals may be selected from the hydrocarbyl radicals listed above as illustrative of R¹ and R², and from acyl radicals, such as acetyl and the like.

Illustrative of Z are vinyl, allyl, propenyl, butenyl, pentenyl, hexenyl, cyclohexenyl, cycloheptenyl, norbornenyl and the like. Preferred for unsaturated substituent Z are the vinyl, norbornenyl and allyl groups. Vinyl is most preferred. Z may contain oxygen atoms in addition to hydrogen and carbon atoms. For example, Z can be a

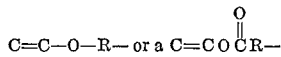

radical in which R is an alkylene of up to about 10 carbon atoms, preferably 1 to 3 carbon atoms.

Formula II above is not intended to be absolutely definitive of the starting materials that may be used in the process of this invention, but is intended to indicate the components of the silanes and siloxanes, i.e., the kinds of atoms, groups of atoms and units which may be present in the silane and siloxane molecules. For example, when $m$ and $o$ are zero, the formula represents a silane; when $m$ is 1 and $o$, $p$ and $q$ are zero, the formula represents a homopolymer, e.g., a disiloxane, or a cyclic trimer or tetramer; and when $m$ is 1 and $o$ is 1, i.e., there are present other units in the molecule, the formula represents a copolymer, terpolymer etc. When it represents a copolymer, the formula is not intended to show ratios of the different types of polymeric units. The Z-containing units may be present in from about 1 percent by weight to about 99 percent by weight. It is preferred that the Z-containing unit be present in an amount of at least about 5 percent by weight.

Siloxane starting materials can range in molecular weight from those having rather low viscosities to those having quite high values, e.g., up to about five million molecular in weight and higher. Preferred siloxanes are those having a molecular weight of up to about one million. It may be desirable or even necessary in some cases to utilize an inert mutual solvent, such as those described hereafter in which to conduct the reaction.

Illustrative organosilicon starting materials are:

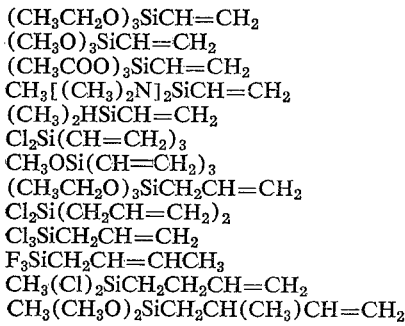

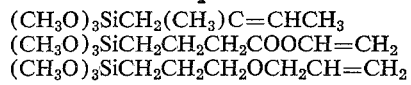

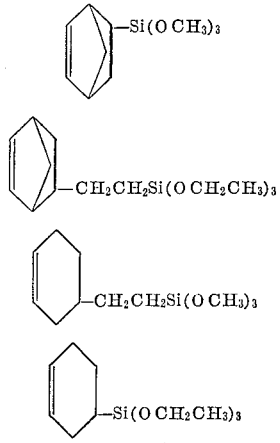

$[CH_2=CH(CH_3)SiO]_{x'}[(CH_3)_2SiO]_{y'}$ wherein $x'+y'$ is at least three.

$[CH_2=CH(CH_3)SiO]_z$ wherein $z$ is at least three.

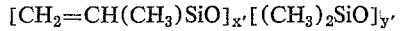
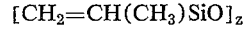
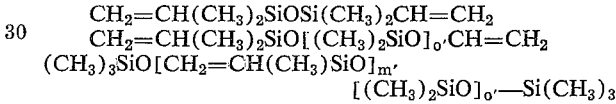

where m' and o' are at least about 1.

The effective catalysts for promoting the condensation of hydrogen cyanide and organosilicon compounds containing at least one unsaturated substituent are coordination complexes of nickel, palladium and platinum in the zero-valent state. The preferred zero-valent complexes are the coordination complexes of nickel and palladium. The complex are at least partly soluble in the reaction mixture.

The catalyst complex used in this invention may be stabilized with carbon monoxide or neutral ligands containing olefinic unsaturation and/or at least one of the following trivalent donor atoms: N, P, As, Bi and Sb in which the carbon monoxide, donor atoms or olefinic unsaturation are capable of occupying positions in the coordination sphere of the metal. The exact structure of the ligands is not critical. The only requirement is that the ligands be capable of stabilizing the zero-valent metal species. The ligands can be monodentate or polydentate. Preferably the ligands are monodentate or bidentate. The monodentate ligands contain one atom or group which can occupy one position in the coordination sphere of the zero-valent metal. The bidentate ligands contain two atoms or groups each of which occupies a position in the coordination sphere of the metal. The number of ligands occupying positions in the coordination sphere will, of course, depend on whether monodentate or bidentate ligands are complexed with the metal. One bidentate ligand is obviously the equivalent of two monodentate ligands. The zero-valent metals are stabilized with the equivalent of 2 to about 4 monodentate ligands. Generally, they are stabilized with the equivalent of 4 monodentate ligands. Without wishing to be bound by any theory of the reaction mechanism underlying the process of our invention, we believe that during the course of the reaction there exist intermediate zero-valent metal complexes stabilized by the equivalent of two or three monodentate ligands. Consequently, Ni(o), Pd(o) or Pt(o) complexes stabilized by the equivalent of two or three monodentate ligands may be used as catalysts in the process of our invention.

The complexes with monodentate ligands are those of the type M(L)$_x$, M being Ni(o), Pd(o) or Pt(o), L being the ligand which is defined as below and $x$ having a value of from 2 to about 4.

The following are illustrative of the types of neutral monodentate ligands (L) which may be employed in this invention:

$$PR_2{}^5R^6$$

where $R^5$ and $R^6$ may be the same or different and are hydrocarbyl groups such as alkyl, aryl, aralkyl, alkaryl, cycloalkyl, alkylcycloalkyl, cycloalkylalkyl and the like;

$$PR_2{}^5(OR^6)$$

where $R^5$ and $R^6$ may be the same or different and are hydrocarbyl groups such as alkyl, aryl, aralkyl, alkaryl, cycloalkyl, alkylcycloalkyl, cycloalkylalkyl and the like;

$$PR^5(OR^6)_2$$

where $R^5$ and $R^6$ may be the same or different and are hydrocarbyl groups such as alkyl, aryl, aralkyl, alkaryl, cycloalkyl, alkylcycloalkyl, cycloalkylalkyl and the like;

$$P(OR^5)_2$$

where $R^5$ is a hydrocarbyl group such as alkyl, aryl, aralkyl, alkaryl, cycloalkyl, alkylcycloalkyl, cycloalkyl alkyl and the like;

$$AsR_3{}^5$$

where $R^5$ is a hydrocarbyl group such as alkyl, aryl, aralkyl, alkaryl, cycloalkyl, alkylcycloalkyl, cycloalkyl alkyl and the like;

$$BiR_3{}^5$$

where $R^5$ is as previously described;

$$SbR_3{}^5$$

where $R^5$ is a hydrocarbyl group such as alkyl, aryl, aralkyl, alkaryl, cycloalkyl, alkylcycloalkyl, cycloalkyl alkyl and the like;

$$R^5-N\equiv C$$

where $R^5$ is a hydrocarbyl group such as alkyl, aryl, aralkyl, alkaryl, cycloalkyl, alkylcycloalkyl, cycloalkyl alkyl and the like;

$$R^5-C\equiv N$$

where $R^5$ is a hydrocarbyl group such as alkyl, aryl, aralkyl, alkaryl, cycloalkyl, alkylcycloalkyl, cycloalkyl alkyl and the like;

Compounds containing olefinic unsaturation, preferably hydrocarbons, and preferably containing from 2 to about 8 carbon atoms, e.g., ethylene, cyclooctene, norbornene and the like;

Heterocyclic bases, such as the heterocyclic amine pyridine and the like; carbon monoxide.

In the above formulas for L any $R^5$ or $R^6$ generally does not contain more than about 12 carbon atoms and preferably contains up to about 6 carbon atoms. The total number of carbon atoms in L generally does not exceed 36 and preferably does not exceed 18. Illustrative of the alkyl groups are methyl, ethyl, propyl, butyl, pentyl, hexyl, decyl, and the like. Illustrative of the aryl groups are phenyl and naphthyl. Illustrative of the aralkyl groups is the benzyl. Illustrative of the alkaryl groups is the tolyl. Illustrative of the cycloalkyl groups are the cyclobutyl, cyclopentyl, cyclohexyl, cyclooctyl, and the like. Illustrative of the alkylcycloalkyl groups are the cycloalkyl groups just listed which contain from 1 to about 3 of any one or a mixture of the above alkyl groups as substituents on the cycloalkyl ring. Illustrative of the cycloalkyl alkyl groups are the alkyl groups listed above which contain 1 or 2 of the cycloalkyl groups listed above as substituents.

Illustrative of the monodentate ligands which may be complexed with zero-valent metals are the trihydrocarbylphosphines such as the trialkylphosphines, e.g., trimethylphosphine, triethylphosphine, tripropylphosphine, tributylphosphine, and the like; the triarylphosphines, e.g., triphenylphosphine and the like; the trialkarylphosphines, e.g., tritolylphosphine and the like; and the mixed phosphines containing both alkyl and aryl radicals, e.g., dimethylphenylphosphine, ethyldiphenylphosphine and the like; the trihydrocarbylphosphites such as the trialkylphosphites, e.g., trimethylphosphite, triethylphosphite, tri-n-butylphosphite, and the like; triarylphosphites, e.g., triphenylphosphite and the like; trialkarylphosphites, e.g., tritolylphosphite and the like; and the mixed phosphites containing both alkyl and aryl radicals, e.g., dimethylphenylphosphite, ethyldiphenylphosphite and the like; the hydrocarbyl dihydrocarbylphosphinites such as the alkyl dialkylphosphinites, e.g., methyl dimethylphosphinite, ethyl diethylphosphinite, propyl dipropylphosphinite, butyl dibutylphosphinite, and the like; the aryl diarylphosphinites, e.g., phenyl diphenylphosphinite and the like; the alkaryl dialkarylphosphinites, e.g., tolyl ditolylphosphinite and the like; and the mixed phosphinites containing both aryl and alkyl radicals, e.g., ethyl diphenylphosphinite and the like; the dihydrocarbyl hydrocarbylphosphonites such as the dialkyl alkylphosphonites, e.g., dimethyl methylphosphonite, diethyl ethylphosphonite, dipropyl propylphosphonite, dibutyl butylphosphonite and the like; the diaryl arylphosphonites, e.g., diphenyl phenylphosphonite and the like; dialkaryl alkarylphosphonites, e.g., ditolyl tolylphosphonite and the like; and the mixed phosphonites containing both aryl and alkyl radicals, e.g., dimethyl phenylphosphonite, and the like; the trihydrocarbylarsines such as the trialkylarsines, e.g., the trimethyl-, triethyl-, tripropyl- and tributylarsines and the like; the triarylarsines, e.g., triphenylarsine and the like; the trialkarylarsines, e.g., tritolylarsine and the like; and the mixed arsines containing both alkyl and aryl radicals, e.g., dimethylphenylarsine, ethyldiphenylarsine and the like; the trihydrocarbylstibines such as the trialkylstibines, e.g., the trimethyl-, triethyl-, tripropyl-, tributylstibines and the like, the triarylstibines, e.g., triphenylstibine and the like, the trialkarylstibines, e.g., tritolylstibine and the like; and the mixed stibines containing both alkyl and aryl radicals, e.g., dimethylphenylstibine, ethyldiphenylstibine and the like; the trihydrocarbylbismuthines, e.g., the trimethyl-, triethyl-, tripropyl-, tributyl-, triphenyl-, tritolyl-, dimethylphenyl-, ethyldiphenyl-bismuthines and the like; the hydrocarbylnitriles, e.g., propionitrile, butyronitrile, valeronitrile, benzonitrile, and the like; the hydrocarbylisonitriles, e.g., propylisonitrile, butylisonitrile, benzylisonitrile and the like; carbon monoxide.

The following general formula is illustrative of the bidentate ligands which may be complexed with Ni(o), Pd(o) and Pt(o) the catalysts used in this invention:

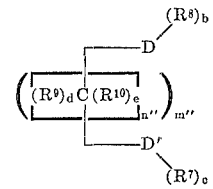

wherein D and D' are heteroatoms selected from the group consisting of nitrogen, phosphorous, arsenic and antimony and may be the same or different hetero atoms;

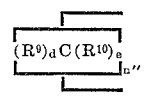

is a bridge linking D and D', $R^9$ and $R^{10}$ are hydrogen, hydrocarbyl groups or hydrocarbyloxy groups, or $R^9$ and $R^{10}$ together can form a monocyclic aliphatic or polycyclic ring system with the carbon atom to which they are attached, or $R^9$ and/or $R^{10}$ together with the carbon atom to which they are attached can form monocyclic or polycyclic aliphatic or aromatic ring systems with another bridge-forming carbon atom and its substituents; $d$ and $e$ are independently either zero or 1, and when the bridge carbon is part of a multiple bond $d$ and/or $e$ are zero; $n''$ is the number of carbon atoms in the bridge and has a value of from 1 to about 4; $m''$ is the number of bridges and has a value of 1 or 2, and when $m''$ is 2, the bridges need to be the same; $R^7$ and $R^8$ are either the same or different hydrocarbyl or hydrocarbyloxy groups or $R^7$ and/or $R^8$ together with one of or both D and D' and one or more bridge-forming carbon atoms can form a hetero-monocyclic or polycyclic ring system, in which case if D or D' is nitrogen two $R^8$ or $R^7$ can represent a double bond to D or D' respectively; $b$ and $c$ are each equal to $3-m''$.

D and D' are preferably nitrogen, arsenic or phosphorus. Most preferred are nitrogen and phosphorus because compounds containing them are relatively readily available.

$R^5$, $R^6$, $R^7$, $R^8$, $R^9$ and $R^{10}$ may also contain other groups which are unreactive under the conditions of the process, such as hydroxy, cyano and the like.

Illustrative of some of the bidentate ligands which may be complexed with No(o), Pd(o) and Pt(o) to form catalysts useful in this invention are:

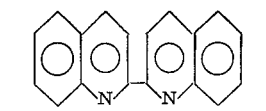

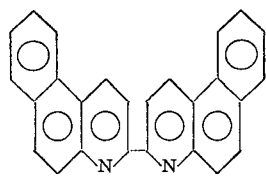

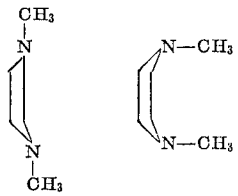

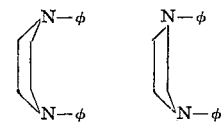

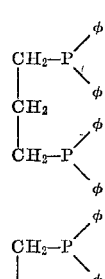

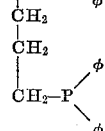

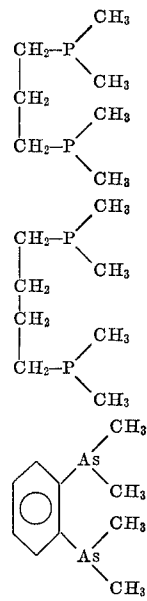

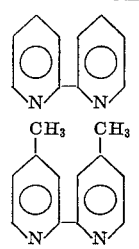

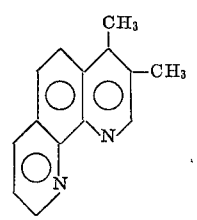

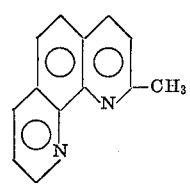

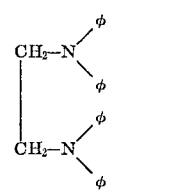

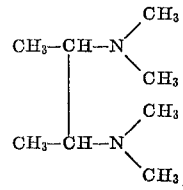

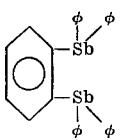

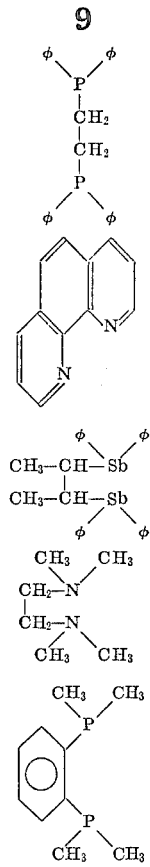

In the above formulas $\phi$ represents phenyl.

Other ligands which may be coordinated to the zerovalent nickel palladium and platinum are heterocyclic bases and mono and diolefins which contain up to about 8 carbon atoms, e.g., 1,5-cyclooctadiene, norbornadiene, acrylonitrile, maleic anhydride and the like.

As stated above, the ligands may be mono- or polydentates, and where more than one ligand is attached to the metal, the ligand may be the same or different.

Preferred catalysts for this novel process are soluble complexes of zerovalent nickel and palladium (M') coordinated with neutral organic compounds of phosphorus, arsenic, or antimony or mixtures thereof.

Examples of preferred catalyst complexes are:

$$M'[PR_3^5]_x$$
where
$x=2$ to 4
$R^5$ as previously defined

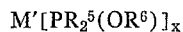
$$M'[PR_2^5(OR^6)]_x$$
where
$x=2$ to 4
$R^5$ and $R^6$ as previously defined

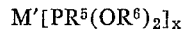
$$M'[PR^5(OR^6)_2]_x$$
where
$x=2$ to 4
$R^5$ and $R^6$ as previously defined

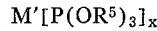
$$M'[P(OR^5)_3]_x$$
where
$x=2$ to 4
$R^5$ as previously defined

$$M'[AsR_3^5]_x$$
where
$x=2$ to 4
$R^5$ as previously defined

$$M'[SbR_3^5]_x$$
where
$x=2$ to 4
$R^5$ as previously defined

The zero-valent complexes used in the process of this invention are well known in the art and can be prepared by the procedures outlined in U.S. 3,102,899; F. R. Olechowski, C. G. McAlisted and R. F. Clark, Inorg. Chem. 4, 246 (1965); J. Chatt, F. A. Hart, and H. R. Watson, J. Chem. Soc., 1962, 2537; G. Wilke, and G. Herrmann, Angew, Chem. internat. edit., 1, 549 (1962); and B. Bogdanovic, M. Kröner, and G. Wilke, Ann., 699, 1 (1966); L. Malatesta and M. Angoletta, J. Chem. Soc. (1955) 3924 and (1957) 1186.

The process of the present invention may be carried out in the presence of "excess, non-reactive ligand." We have found that such operation of the process dramatically enhances the activity of the metal catalyst for HCN addition to olefins. The ratio of moles of "excess, non-reactive ligand" (which can be the same as or different from the ligand in the catalyst complex) to moles of hydrogen cyanide is varied within the range of about 0.1 to 1 to about 25 to 1. Preferred is a range of 0.3 to 1 to 10 to 1. The "excess, non-reactive ligand" employed in this invention is a neutral ligand containing at least one of the following trivalent donor atoms: N, P, As, Sb, with the proviso that when the excess, non-reactive ligand is one containing a trivalent nitrogen atom the nitrogen is present as an amino- or isonitrile functional group. The excess ligand may be selected from those listed above for the catalyst complex.

Although enhancing catalytic activity, the use of large quantities of excess, non-reactive ligand is particularly undesirable for large scale synthesis. Fortunately, the excess, non-reactive ligand concentration can be greatly reduced and in certain instances completely avoided if, instead of adding all the HCN at the start of the reaction, it is added continuously at a rate such that the ratio of its unreacted concentration to excess ligand is within the range given above, preferably the concentration of unreacted HCN remains at or below the concentration of excess ligand employed. This may be accomplished by either the direct addition of liquid HCN continuously, or by the introduction of gaseous HCN into the reaction mixture alone or with an inert carrier gas.

The ratio of reactants is not critical, but ratios in the range from about 0.05 to 100 mols of olefinically unsaturated organic compound per mole of HCN are preferred. More preferred is a ratio in the range of from about 0.5 to about 100 mols.

The catalyst may be used in a concentration of from about 0.0005 mol percent to about 10 mol percent based on the olefin or HCN reactant, whichever is limiting. The preferred catalyst concentration for operating the process lie in the range of from about 0.001 to about 2 mol percent based on the limiting reactant. Highly preferable are concentrations in the range of from about 0.001 to about 2 mol percent based on the limiting reactant. Highly preferable are concentrations in the range of from about 0.001 to about 0.1 mol percent based on the limiting reactant.

Preferably the reaction is conducted under substantially anhydrous conditions; however, small amounts of water usually present in commercial liquid hydrogen cyanide may be tolerated in the reaction. Greater amounts of water generally result in lower conversions. It is preferred that the hydrogen cyanide be substantially dried before use.

The process may be conducted in the absence or the presence of an inert solvent. Suitable solvents in which to conduct the process include ethers, esters, aliphatic hydrocarbons, aromatic hydrocarbons, aliphatic and aromatic nitriles. Examples of suitable solvents include benzene, toluene, heptane, cyclohexane, tetrahydrofuran, ethyl acetate, acetonitrile, propionitrile and benzonitrile, dipropyl ether, dibutyl ether, anisole, and the like. The solvent may be used in any desired proportions, such as between 0.5 mole and 10 moles or more based on the olefinic compound.

Effective operation of this process requires temperatures of about room temperature, i.e., about 20° C., or greater. The process may be operated at reaction temperatures as high as about 350° C. Preferred reaction temperatures lie in the region of from about 50° to 250° C. Particularly preferred operating temperatures lie in the range of from about 100° to about 225° C. The operating temperature chosen should not be so high as to be above the decomposition temperature of the organosilicon compound containing olefinic unsaturation.

The process may be operated at atmospheric pressure or lower with organosilicon reactants of low volatility. When volatile organosilicon compounds are reacted, the reaction may be conducted in pressure vessels at pressures up to about 20,000 p.s.i.g. The preferred pressure range for operating the process ranges from about 1 to about 3,000 p.s.i.g.

The reaction time is obviously a function of the catalyst and reactant concentration, the reaction temperature and degree of reactant conversion desired. In certain instances, short residence times, e.g., on the order of minutes, may be employed. In other instances longer reaction times, e.g., from one to several hours, may be employed.

The mode of operation of the process is generally not critical. The reaction may be operated batch-wise or continuously. For example, in batch-wise operation, the reactants, excess ligand, catalyst and solvent, if any, can be charged to a closed reaction vessel, which can then be heated to reaction temperature, at which it is maintained until the reaction is completed. Unreacted HCN can be vented from the system and collected for reuse. Unreacted organosilicon reactant can be distilled from the reaction mixture, and this also can be reused. Product nitrile may be used as a residue product or in some instances may be purified by distillation, recrystallization or other methods known to those skilled in the art. In cases where the product is distilled, the nonvolatile catalyst remains as residue and may be reused. In continuous operation, HCN may be added continuously to the organosilicon reactant-catalyst-ligand reaction mixture. As pointed out above, this reduces the amount of excess, non-reactive ligand required to produce a given quantity of product nitrile. The continuous process is therefore preferred. The recycle of reactants and isolation of products may be handled in the same manner as in batch-wise operation.

In general the process is one in which the hydrogen from hydrogen cyanide adds to one end of the double bond and the cyanide adds to the other. With unsymmetrical organosilicon reactants, one generally observes a mixture of nitrile products. Since not all double bonds are of the same reactivity, the addition of HCN to a diolefinic organosilicon reactant, for example, may occur almost exclusively at the more reactive of the two double bonds; and attack on the second double bond may not proceed to any appreciable extent until the more reactive double bond has been completely reacted.

The following are illustrative of the products which may be produced by the process of this invention:

$(CH_3CH_2O)_3SiCH_2CH_2CN$
$(CH_3CH_2O)_3SiCH(CN)CH_3$
$(CH_3O)_3SiCH_2CH_2CN$
$(CH_3O)_3SiCH(CN)CH_3$
$(CH_3COO)_3SiCH_2CH_2CN$
$CH_3[(CH_3)_2N]_2SiCH_2CH_2CN$
$(CH_3)_2HSiCH_2CH_2CN$
$Cl_2Si(CH_2CH_2CN)_2$
$CH_3OSi(CH_2CH_2CN)_3$
$(CH_3CH_2O)_3SiCH_2CH_2CH_2CN$
$(CH_3O)_3SiCH_2CH(CN)CH_3$
$Cl_2Si(CH_2CH_2CH_2CN)_2$
$Cl_3SiCH_2CH_2CH(CN)CN_3$
$F_3SiCH_2CH(CN)CH_2CH_3$
$CH_3(Cl)_2SiCH_2CH_2CH_2CH_2CN$ $CH_3(CH_3O)_2SiCH_2CH(CH_3)CH(CN)CH_3$
$(CH_3O)_3SiCH_2(CH_3)C(CN)CH_2CH_3$
$(CH_3O)_3SiCH_2CH_2CH_2COOCH_2CH_2CN$
$(CH_3O)_3SiCH_2CH_2CH_2OCH_2CH_2CH_2CN$

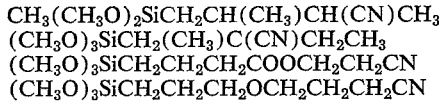

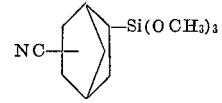

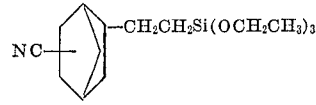

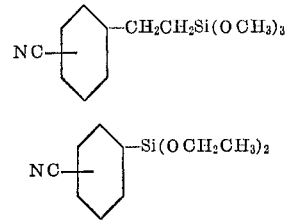

$[NCCH_2CH_2(CH_3)SiO]_{x'}[CH_2=CH(CH_3)SiO]_{4'}$
$[NCCH_2CH_2(CH_3)SiO]_{x'}[(CH_3)_2SiO]_{y'}$ where $x'+y'$ is at least three $CH_2=CH(CH_3)_2SiOSi(CH_3)_2CH_2CH_2CN$
$NCCH_2CH_2(CH_3)_2SiOSi(CH_3)_2CH_2CH_2CN$
$NCCH_2CH_2(CH_3)_2SiO[(CH_3)_2SiO]_{o'}CH_2CH_2CN$
$(CH_3)_3SiO[NCCH_2CH_2(CH_3)SiO]_{m'}$
$[(CH_3)_2SiO]_{o'}Si(CH_3)_3$ where $m'$ and $o'$ are at least about 1.

This novel process offers an efficient synthetic route of wide applicability by which low-cost organosilicon reactants are converted to desirable nitrile products. Nitriles are recognized as important chemical intermediates, readily convertible to useful condensation monomers containing substituents such as hydrocarbylcarboxy, hydrocarbylamine and hydrocarbylisocyanate. For example, $(CH_3CH_2O)_3SiCH_2CH_2C\equiv N$ can be reduced to $(CH_3CH_2O)_3SiCH_2CH_2CH_2NH_2$ a well-known coupling agent marketed by Union Carbide, the Discovery Company. Monomeric products of this invention such as $(CH_2=CH)(N\equiv CCH_2CH_2)Si(OCH_2CH_3)_2$ may themselves be used as coupling agents. The polymers, e.g., high viscosity cyanopropylmethyl siloxanes, may be used as a highly polar stationary phase in vapor phase chromatography to give better separation of polar components in the mixture being chromatographed. Copolymeric gumstocks containing about 5 mole percent cyanoethyl methylsiloxy units yield silicone rubbers having excellent low temperature properties and better solvent resistance than those from similar gumstocks containing the same amounts of diphenylsiloxy units in place of the cyanoethyl methylsiloxy units. As is known in the art, gumstocks containing greater amounts, e.g., 25%, 50%, 75%, even 100%, of cyano-containing siloxy units may be prepared and used to prepare silicone rubbers having very good solvent resistance. To our knowledge the present invention is the first economical way of making difunctional cyanohydrocarbyl silanes and siloxanes, particularly cyanoethyl silanes and siloxanes, which may be used to prepare these gumstocks.

EXAMPLE 1

Vinyltriethoxysilane (20 g., 0.105 mole), nonane (20 ml.) and tetrakis[triphenylphosphite]palladium (0) (3.38 g., 0.0025 mole) were charged to a reaction flask fitted with a water-cooled cndenser, thermometer, sparger, and serum-capped outlet for removing samples of reaction mixture. The reaction mixture was stirred magnetically and heated to 135° C. During the heat up a nitrogen sparge was maintained through the reactor. On reaching reaction temperature, the nitrogen flow was diverted to flow thru a reservoir containing liquid HCN at 0° C. prior to passing into the reaction flask. In this way HCN was swept into the reactor. The nitrogen flow was controlled so that HCN was introduced into the reactor at 1–2 ml./hour. At the end of 6.5 hours a total of 12.4 ml. HCl had been swept thru the reactor. The reaction was terminated at this point. Fractional distillation of the reaction mixture gave 16.78 g. (73.3% yield based on olefin) of a mixture of β- and α-(triethoxysilyl)propionitrile. As determined by gas chromatography, the β:α molar ratio was 11:1.

EXAMPLE 2

By the technique described in Example 1, vinylmethyldiethoxysilane (16.0 g., 0.1 mole) was reacted with HCN in the presence of tetrakis[triphenylphosphite]palladium (0) (2.7 g., 0.002 mole) at 135° C. During 7 hours, a total of 15.2 ml. HCN was swept thru the reactor at which point the reaction was terminated. Fractional distillation of the reaction mixture give 5.7 g. of product identified by mass spectroscopy, nuclear magnetic resonance, elemental analysis as β-(methyldiethoxysilyl)propionitrile.

EXAMPLE 3

1,3 - divinyltetramethyldisiloxane (18.6 g., 0.1 mole), tetrakis[triphenyl phosphite]palladium (0) (2.70 g., 0.002 mole), and anisole (18.6 g.) were charged to a reaction flask fitted with reflux condenser, thermometer, gas sparger and serum-capped outlet for removing samples of reaction mixture. The reaction flask was heated to 135° C. while it was being purged with a nitrogen flow. After reaching reaction temperature the nitrogen flow was diverted to pass through liquid HCN contained in a reservoir prior to passing into the reactor. In this way gaseous HCN was introduced into the reactor at the rate of 0.025–0.05 mole/hour by adjusting the nitrogen flow rate. In about 20 hours a total of 0.5 mole of HCN was introduced. The reaction mixture was then fractionally distilled to give 20.3 g. of 1,3-bis(β-cyanoethyl)tetramethyldisiloxane (84.5% yield in olefin) as determined by nuclear magnetic resonance.

EXAMPLE 4

By the technique described in Example 3, 1,3-divinyltetramethyldisiloxane (18.6 g., 0.1 mole) was reacted with HCN in the presence of tetrakis[triphenyl phosphite] palladium (0) (2.70 g., 0.002 mole) in anisole (18.6 g.) at 130° C. Over a 1.5 hour period, a total of 10 ml. (0.25 mole) HCN was passed through the reactor. Distillation of the reactor mixture afforded 7.4 g. of a product identified as 1-(β-cyanoethyl)-3-vinyltetramethyldisiloxane and 2.1 g. 1,3-bis(β-cyanoethyl)tetramethyldisiloxane.

EXAMPLE 5

By the technique described in Example 3, allyltriethoxysilane (15.3 g., 0.075 mole) was reacted with HCN in the presence of tetrakis[triphenyl phosphite]palladium (0) (2.02 g., 0.0015 mole) at 120° C. In a period of 20 hours, a total of 20 ml. (0.5 mole) of HCN was passed through the reactor. Distillation of the reaction mixture afforded 8.5 g. (49.1% yield) of triethoxysilylbutyronitriles comprising a 50:50 mixture of 4-triethoxysilylbutyronitrile and 2-methyl - 3 - triethoxysilylpropionitrile.

What we claim is:

1. A process for producing cyano-substituted organosilicon compounds which comprises contacting hydrogen cyanide with an organosilicon compound which contains the radical $Z_n$—Si≡ wherein at least one of the three free valences of the silicon atom are bonded directly to hydrolyzable groups selected from the group consisting of halo, alkoxy, acyloxy, aryloxy and amino and/or oxygen which in turn is bonded to other silicon atoms to form a siloxane, the remaining free valencies of the silicon being bonded to monovalent organic groups, Z is a radical containing from 2 to about 18 carbon atoms and contains olefinic unsaturation and $n$ is from 1 to 3, in the presence of a zero-valent nickel, palladium or platinum complex and at a temperature of from about 20° C. to about 350° C. and a pressure of from about 1 to about 20,000 p.s.i.g., said hydrogen cyanide, organosilicon compound and said zero-valent nickel, palladium or platinum complex are in a homogeneous liquid phase, and recovering a cyano-substituted organosilicon compound wherein said hydrogen cyanide adds as said olefinic unsaturation of said organosilicon compound.

2. The process of claim 1 wherein a zero-valent palladium complex is used.

3. The process of claim 1 wherein there is present in the reaction mixture excess non-reactive ligand containing at least one trivalent donor atom selected from the group consisting of nitrogen, phosphorus, arsenic and antimony, with the proviso that when the excess non-reactive ligand is one containing a trivalent nitrogen atom the nitrogen is present as an amino- or isonitrile functional group.

4. The process of claim 3 wherein the ratio of moles of excess ligand to moles of hydrogen cyanide is within the range of from about 0.1 to 1 to about 25 to 1.

5. The process of claim 4 wherein the ratio is from about 0.3 to about 10 to 1.

6. The process of claim 2 in which the palladium is complexed with neutral ligands selected from the group consisting of carbon monoxide, compounds containing olefinic unsaturation and compounds having at least one donor atom selected from the group consisting of nitrogen, phosphorus, arsenic and antimony.

7. The process of claim 6 wherein there is present excess non-reactive ligand containing at least one trivalent donor atom selected from the group consisting of nitrogen, phosphorus, arsenic and antimony, with the proviso that when the excess non-reactive ligand is one containing a trivalent nitrogen atom the nitrogen is present as an amino- or isonitrile functional group.

8. The process of claim 7 wherein the ratio of moles of excess ligand to moles of hydrogen cyanide is within the range of from about 0.1 to 1 to about 25 to 1.

9. The process of claim 8 wherein the ratio is from about 0.3 to 1 to about 10 to 1.

10. The process of claim 2 wherein the hydrogen cyanide is added to the reaction mixture over the period of the reaction.

11. The process of claim 3 wherein at any point during the time of the reaction the instantaneous mole ratio of excess, non-reactive ligand to unreacted hydrogen cyanide is within the range of from about 0.1 to 1 to about 25 to 1.

12. The process of claim 2 wherein the zero-valent palladium is complexed with monodentate or bidentate ligands.

13. The process of claim 12 wherein the ligands contain trivalent nitrogen or phosphorus as donor atoms.

14. The process of claim 2 wherein the temperature is from about 50° C. to about 250° C.

15. The process of claim 2 wherein the pressure is from about 1 to about 3000 p.s.i.g.

16. The process of claim 1 wherein the organosilicon compound has the component formula

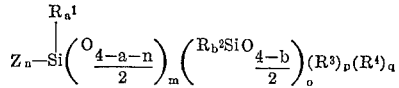

wherein Z is a radical containing from 2 to about 18 carbon atoms and contains olefinic unsaturation; $n$ has a value from 1 to 3; $R^1$ and $R^2$ are hydrogen or a monovalent organic group bonded to silicon by a carbon-to-silicon bond and each contains up to about 12 carbon atoms; $R^3$ is a hydrolyzable and/or condensible radical selected from the group consisting of hydroxyl, alkoxy, aryloxy, acyloxy, amino and halo; $R^4$ is hydrogen, alkyl, aryl or acyl; $m$ is 0 to 1; $a$ is 0, 1 or 2; $b$ is 0, 1, 2 or 3; $o$ is 0 or 1, and $o$ is 0 when $m$ is 0; $p$ is equal to $4-a-n$ when $m$ is 0, and when $m$ is 1, $p$ is 0; and $q$ is 0 when $p$ is equal to $4-a-n$ and $q$ is 0 or a positive number when $m$ is 1.

References Cited

UNITED STATES PATENTS

| | | | |
|---|---|---|---|
| 3,030,403 | 4/1962 | Pike | 260—448.2 |
| 3,046,292 | 7/1962 | Pike | 260—448.2 |
| 3,046,295 | 7/1962 | Lisanke | 260—448.2 |
| 3,054,817 | 9/1962 | Pepe et al. | 260—448.2 |
| 3,053,874 | 9/1962 | Pepe et al. | 260—448.2 |
| 3,168,544 | 3/1965 | Jex | 260—448.2 |
| 3,185,719 | 5/1965 | Prober | 260—448.2 |

TOBIAS E. LEVOW, Primary Examiner

W. F. BELLAMY, Assistant Examiner

U.S. Cl. X.R.

260—448.2N, 448.8R

UNITED STATES PATENT OFFICE
CERTIFICATE OF CORRECTION

Patent No. 3,595,897                    Dated July 27, 1971

Inventor(s) Earle S. Brown et al

It is certified that error appears in the above-identified patent and that said Letters Patent are hereby corrected as shown below:

Column 2, line 17, "typical" should read --typically--. Column 3, line 56, delete "in". Column 10, line 50, "concentration" should read --concentrations--; line 55, delete entire sentence starting with "Highly" and ending with "reactant". Column 12, line 24, that portion of the formula reading: "$SiO]_4$'" should read --$SiO]_y$'--; line 73, "cndenser" should read --condenser--. Column 13, line 9, "HCL" should read --HCN--.

Signed and sealed this 3rd day of December 1974.

(SEAL)
Attest:

McCOY M. GIBSON JR.          C. MARSHALL DANN
Attesting Officer            Commissioner of Patents